United States Patent [19]

Chamran et al.

[11] 4,322,807
[45] Mar. 30, 1982

[54] SAFE MEMORY SYSTEM FOR A SPECTROPHOTOMETER

[75] Inventors: Morteza M. Chamran, Elmhurst, Ill.; Larkin B. Scott, Fort Worth, Tex.; Paul B. Williams, Lombard, Ill.

[73] Assignee: The Perkin-Elmer Corporation, Norwalk, Conn.

[21] Appl. No.: 128,028

[22] Filed: Mar. 7, 1980

[51] Int. Cl.³ .............................................. G01J 3/42
[52] U.S. Cl. ................................... 364/498; 356/319; 364/524
[58] Field of Search ............... 364/485, 498, 524, 707, 364/200, 900; 356/305, 318–325, 331, 334; 365/226–229

[56] References Cited

U.S. PATENT DOCUMENTS

| | | | |
|---|---|---|---|
| 3,717,809 | 2/1973 | Laukien | 364/498 |
| 3,818,197 | 6/1974 | Piccolo et al. | 364/498 |
| 3,972,617 | 8/1976 | Shibata et al. | 356/319 |
| 4,130,899 | 12/1978 | Bowman et al. | 365/227 |
| 4,140,394 | 2/1979 | Roos | 364/498 |
| 4,143,283 | 3/1979 | Graf et al. | 364/900 |
| 4,145,761 | 3/1979 | Gunter | 365/227 |
| 4,171,913 | 10/1979 | Wildy et al. | 364/498 |
| 4,176,957 | 12/1979 | Maeda et al. | 356/319 |
| 4,194,217 | 3/1980 | van den Bosch | 356/323 |
| 4,221,484 | 9/1980 | Mould | 356/319 |

FOREIGN PATENT DOCUMENTS 1421788 1/1976 United Kingdom ................ 356/319

OTHER PUBLICATIONS

Morgenthaler et al., "Application of a Microcomputer System for Control of an Atomic Absorption Spectrometer", *Am. Lab.*, Aug. 1976, vol. 8, No. 8, pp. 37–45.
Farley et al., "Microcomputer-Controlled Microwave-Optical Spectrometer", *J. Phys. E: Sci. Instr.*, vol. 13, Feb. 19, 1980, pp. 848–856.
Aaronson et al., "A UV–Vis Spectrophotometer Controlled by a Programmable Desk-Top Calculator", *Am. Lab.*, vol. 7, No. 9, Sep. 1975, pp. 57–63.
Cary-Model 60 Recording Spectropolarimeter Brochure, 1969.

*Primary Examiner*—Errol A. Krass
*Attorney, Agent, or Firm*—F. L. Masselle; E. T. Grimes; R. A. Hays

[57] ABSTRACT

A microprocessor based spectrophotometer including a memory system for providing storage locations of sets of operating parameters and correction data. The operator loads the memory via keyboard control. The memory system is battery backed-up for maintaining stored data during power shutdown of the spectrophotometer system.

9 Claims, 4 Drawing Figures

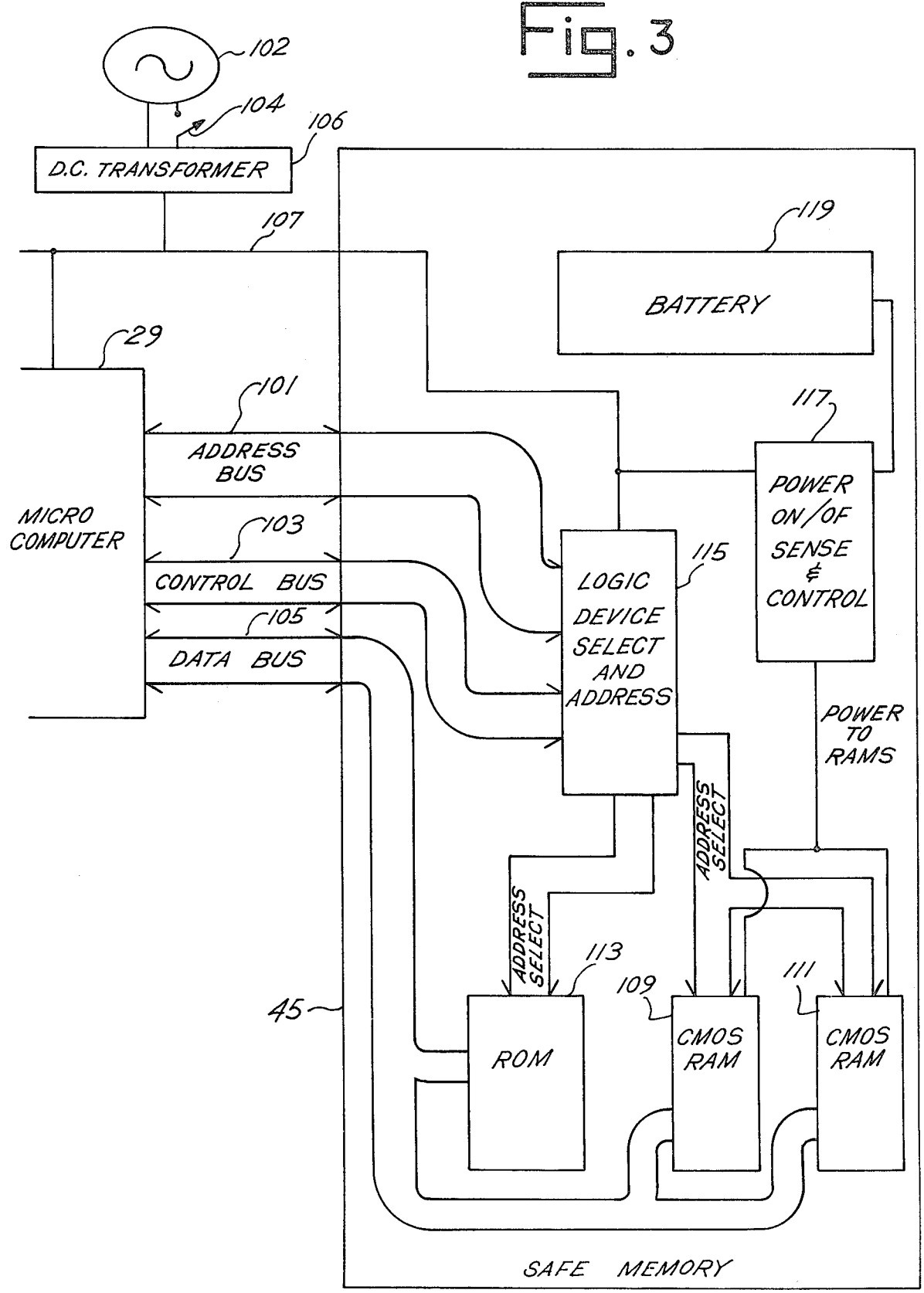

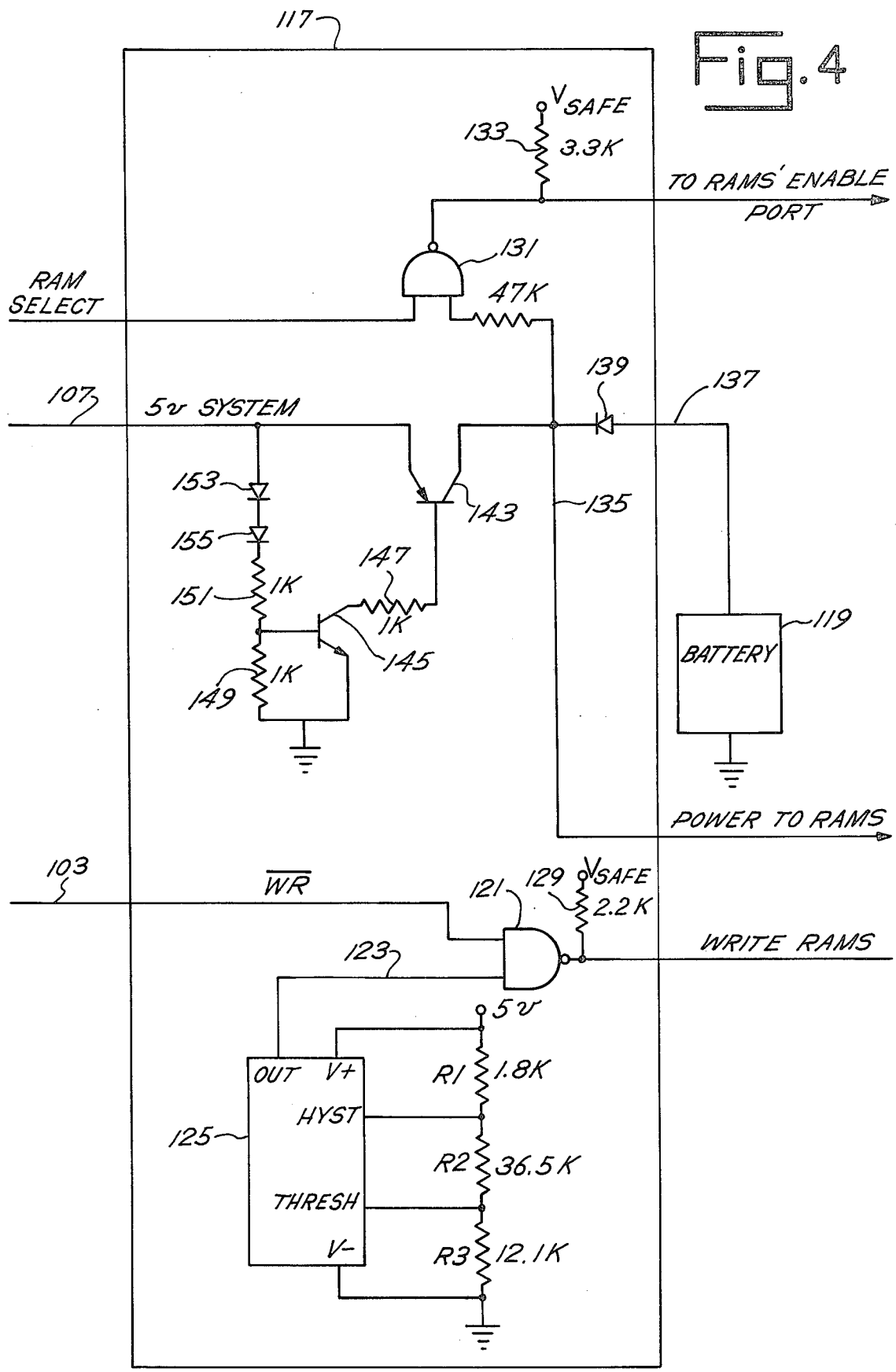

SAFE MEMORY SYSTEM FOR A SPECTROPHOTOMETER

RELATED PATENT APPLICATIONS

This application is related to the following four U.S. patent applications filed on even date herewith: (1) Ser. No. 128,029, entitled MANUAL WAVELENGTH ADJUSTMENT FOR A MICROPROCESSOR BASED SPECTROPHOTOMETER, by Larkin B. Scott, Morteza M. Chamran, and Paul B. Williams; (2) Ser. No. 128,027, entitled SPECTROPHOTOMETER IMPROVEMENT OF IMPROVED AUTOMATIC WAVELENGTH INDEXING INITIALIZATION APPARATUS by Morteza M. Chamran, Larkin B. Scott and Paul B. Williams; (3) Ser. No. 128,030, entitled FILTER INDEXING FOR SPECTROPHOTOMETER SYSTEM, by Paul B. Williams, Larkin B. Scott and Morteza M. Chamran; and (4) Ser. No. 128,289, entitled A SPECTROPHOTOMETER SYSTEM HAVING POWER LINE SYNCHRONIZATION, by Morteza M. Chamran, Larkin B. Scott, Paul B. Williams and M. A. Ford.

BACKGROUND OF THE INVENTION

The invention relates to a spectrophotometer system and, more particularly, to a microcomputer based spectrophotometer having a battery backed-up external memory system.

In a spectrophotometer system, the operator may desire to perform an analysis in accordance with various operating parameters. Unfortunately, time is involved for the operator to set up the analysis procedure by selection of the various parameters. Time is further spent when the system power is turned off and parameters are lost, and have to be re-entered upon turning on the system. The problem is further exacerbated where an analyzing procedure is to be performed in several different fashions so that parameters must be reset frequently.

It is, therefore, an object of the present invention to provide a spectrophotometer system in which operating parameters of the system may be stored in memory and selectively retrieved upon operator's command.

It is a further object of the present invention, to provide a spectrophotometer system in which a memory system capable of handling a plurality of sets of parameters is selectively addressable for selecting one of the plurality of sets of parameters for performing an analysis procedure.

It is still a further object of the present invention to provide a spectrophotometer system in which a memory is utilized to control a plurality of stored parameters, and in which the memory system is backed-up by a D.C. battery for retention of parameter data during power off of the system.

SUMMARY OF THE INVENTION

These and other objects of the invention are achieved in a microprocessor based spectrophotometer system in which a keyboard control permits an operator to generate a plurality of operating parameters for storage in a memory system. The memory system includes a D.C. battery for maintaining the stored operating parameters during power shut-down of the spectrophotometer.

BRIEF DESCRIPTION OF THE DRAWINGS

FIG. 3 is a block diagram of a safe memory system of the spectrophotometer of FIG. 1.

FIG. 4 is a schematic diagram of a power ON/OFF sense and control circuitry of the safe memory system of FIG. 3.

DESCRIPTION OF THE PREFERRED EMBODIMENT

The above related applications disclose specific apparatus of features broadly described herein, and such applications are incorporated herein by reference. Specific apparatus necessary for understanding the preferred embodiment of the present invention are described as follows.

Figure 1:
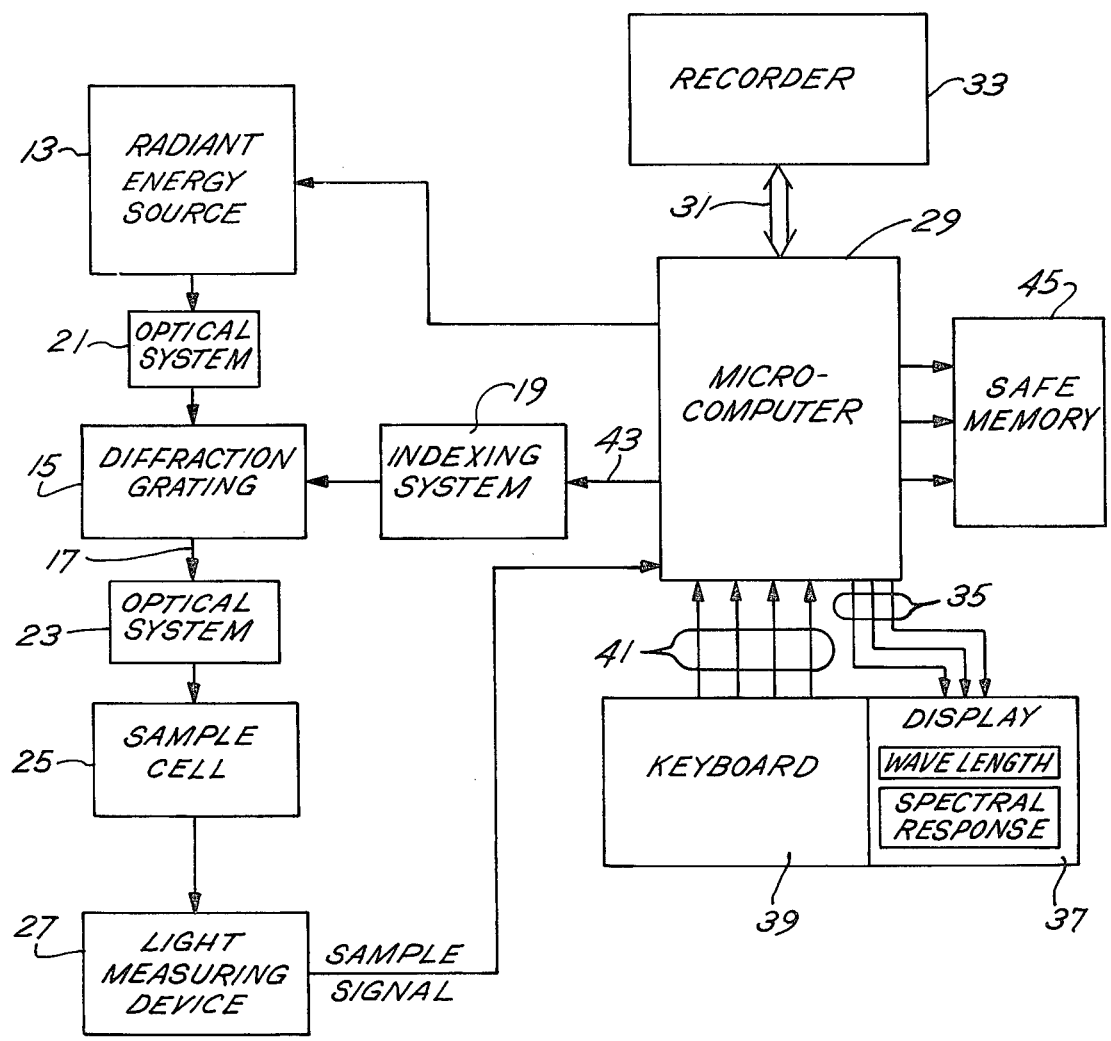
FIG. 1 is a block diagram of a spectrophotometer embodiment of the present invention.

Referring to FIG. 1, a spectrophotometer system 11 includes a radiant energy source 13 which provides a beam of radiation to a diffraction grating 15 for generating a beam 17 of monochromatic radiant energy (hereinafter monochromatic light). An indexing system 19 controls diffraction grating 15 for changing the wavelength of the monochromatic light in sequence over a predetermined spectral range.

A first optical system 21 is disposed between source 13 and grating 15, and a second optical system 23 is disposed between grating 15 and a sample cell 25. The optical systems 21, 23 insure proper generation of the monochromatic light and serve to direct the monochromatic light through sample cell 25 and onto a light measuring device 27. Measuring device 27 generates a sample signal as the measure of radiant energy passing through the substance in sample cell 25, hereinafter referred to as the spectral response of light measuring device 27.

A conventional microcomputer 29 controls the overall system processing and management of the spectrophotometer system 11. The microcomputer performs a number of tasks which may be summarized as follows:

(1) data is received from the light measuring device 27 in the form of an analog signal which is converted to a digital signal for processing; the processed digital signal is converted to an analog recording signal for output along a bus 31 to a recorder 33; the processed digital signal also is converted to display data for output along a bus 35 to a display 37;

(2) scanning information is received from a keyboard 39 via a bus 41 and is manipulated to provide output commands along a conductor 43 to indexing system 19 for sequencing diffraction grating 15 through a spectral range;

(3) other display data is generated and transmitted to display 37 for visually displaying an indication of the particular wavelength of the monochromatic beam passing through sample cell 25; and (4) operational parameters and digital data are stored in and retrieved from a safe memory 45.

Microcomputer 29 is a conventional 8-bit, parallel bus microprocessor having an accumulator, a plurality of registers and a CPU control for interpretation and execution of micro-level assembly language instructions; a memory system including random access memory and read-only memory is also included in microcomputer 29, as will be understood. The microcomputer treats recorder 33, keyboard 39 and display device 37 as peripheral devices which are interconnected by means of bus cables.

One suitable microprocessor for use in microcomputer 29 is a Motorola MC 6802. Reference is made to Motorola manual ADI-436 which describes the MC 6802, and reference is made to "Introduction to Microprocessor", by Herve Tireford of Motorola Semiconductor Products, Inc., 1975.

The system is managed under the control of keyboard 39. Keyboard 39 is manually actuable for permitting the operator to provide a number of instructions and control data to microcomputer 29 for controlling the particular analysis performed by the system. For example: the speed at which indexing system 19 sequences the wavelength of the monochromatic light can be controlled by microcomputer 29. Also, the particular range of the wavelength to be scanned may be likewise controlled. For example: it may only be required that the particular sample be examined over a wavelength range of 400 to 800 nanometers.

A display 37 also is provided for presenting visual information to the operator for indicating the wavelength of the monochromatic beam being generated and the value of the spectral response from the displayed wavelength passing through the substance in sample cell 25. Also, a display identifying a particular operating set of instructions being utilized by the operator is provided, as described hereinafter.

Microcomputer 29 is connected to safe memory 45 for storage of particular operating parameters and data which are desired to be saved during turn-off of the system and to be reused at a subsequent time after reinitiating power to the system. Safe memory 45 is addressable from the keyboard 39 for instructing microcomputer 29 to merely utilize operating parameters stored in the safe memory so that the stored instructions do not need to be rekeyed by the operator each time the system is turned on.

Figure 2:
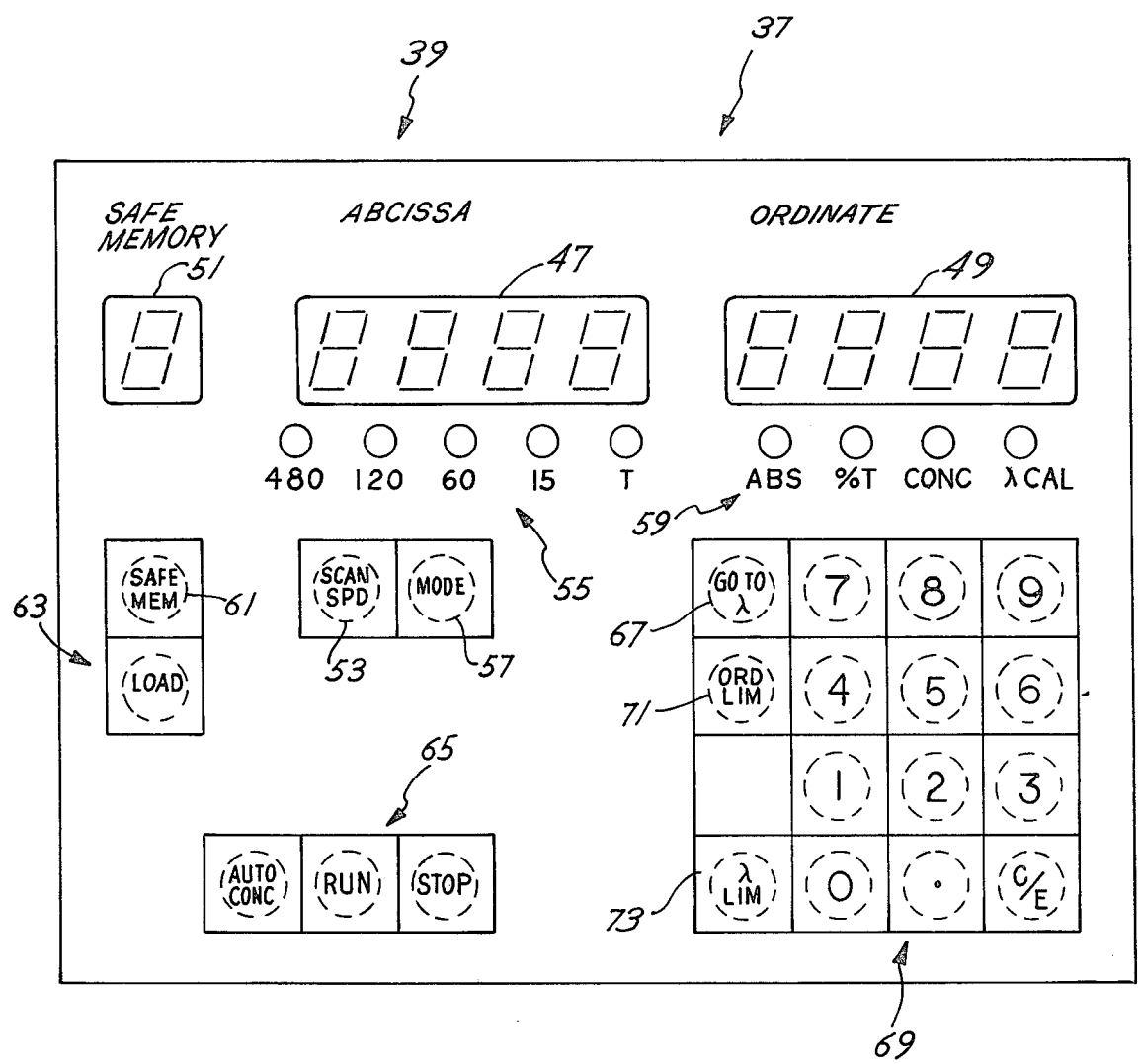
FIG. 2 is a diagram of a keyboard and display of the spectrophotometer of FIG. 1.

Referring to FIG. 2, keyboard 39 and display 37 are illustrated in detail. A four-digit abcissa display 47 is generally utilized to indicate the current monochromator wavelength being generated. A four-digit ordinate display 49 is generally utilized to indicate the spectral response of the substance in terms of sample absorbance, transmittance, concentration or single beam energy. A safe memory display 51 is utilized to display one of five particular sets of memory locations in safe memory 45 where operating parameters or correction data are stored.

Selection of operating parameters for controlling the spectrophotometer analysis is performed by the operator from the keyboard.

A scan speed key 53 is utilized to select a scan speed parameter. Successive actuation of scan speed key 53 consecutively lights one of the five (5) lights of a five light display 55 for indicating the selection of a predetermined scan speed parameter of 15, 60, 120 or 480 nm/min., or indicting selection of a time drive operation (T) for running the recorder at a fixed wavelength.

A mode key 57 is provided for selection of the mode of analysis parameter. Successive actuation of mode key 57 consecutively lights one of four (4) lights of a four digit display 59 for indicating the selection of a mode of analysis of either absorbance, transmittance, concentration, or single beam which latter serves to fix the photomultiplier voltage for utilizing the system for wavelength calibration check.

A safe memory key 61 is provided for selecting a particular set of five memory locations in safe memory where operating parameters or correction data can be stored and utilized during an analysis. Successive actuation of safe memory key 61 sequences safe memory display 51 through the five memory locations identified as follows: 0, 1, 2, 3 and "C", for indicating the selection of a predetermined memory location. Three of the sets of memory locations identified by "1", "2" or "3" being displayed in display 51, may be utilized for storing specific operating parameters, each set in a separate one of such memory locations. The operating parameters may then be utilized by the microcomputer upon selection by memory key 61 for controlling the spectrophotometer analysis in accordance with the parameters stored in the selected memory location.

The operational parameters stored in one of the three memory location sets are protected from being inadvertently changed, by requiring the operator to actuate a load key 63 for changing the parameters stored in the displayed memory location. Actuation of load key 63 permits parameters keyed by the operator from the keyboard to be loaded in the memory location indicated in safe memory display 51. For example: with safe memory display in its "1" position, actuation of load key 63 in conjunction with scanning speed key 53 will cause a change in the scanning speed of the operator parameter located at the safe memory location "1".

Safe memory location "0" is a non-protected memory location in that it is not necessary to actuate load key 63 in order to change a parameter stored in memory location "0". Memory location "0" is utilized as the conventional keyboard controlling function in which the operator keys in operating parameters at different selected times for performing a desired analysis without intending to store a set of operating parameters for later use.

The memory location "C" stores base line correction data. Safe memory key 61 is actuated to the "C" display when instructing the microcomputer to recompute new base-line correction data.

Keyboard 39 may include several additional keys generally indicated at 65, such as a RUN key for initiating scanning of wavelengths or driving of the recorder; an AUTO CONC key for use to enter the concentration of a known sample for automatic calculation of the concentration factor, and a STOP key for use to stop the monochromator and chart motion immediately. Other keys may also be provided for instructing the microcomputer to perform a particular function, etc.

A GO TO key 67 causes the spectrophotometer to move to a wavelength entered on a numeric keypad 69, as described in the above referenced U.S. patent application Ser. No. 128,029. An ORD LIM key may be used to enter maximum and minimum ordinate values for the recorder. A wavelength limit key 73 may be utilized to key in the upper and lower wavelength scan limits. Holding ORD LIM key 71 or wavelength limit key 73 down will cause its respective limits to be displayed in displays 47, 49.

Referring to FIG. 3, safe-memory 45 is illustrated in greater detail. Microcoputer 29 communicates with safe memory 45 via address bus 101, a control bus 103 and a data bus 105. A five volt power line 107 provides five volts from the system transformer 106 to microcomputer 29 and to SAFE memory 45. An ON/OFF switch 104 connects/disconnects the spectrophotometer from house current 102.

Safe memory 45 includes a pair of CMOS RAMs 109, 111 and a ROM 113 which are addressable via a logic device 115. Microcomputer 29 presents an address along address bus 101 to logic 115 for addressing RAMs 109, 111 or ROM 113. The addressed RAM or ROM presents data on data bus 105 to microcomputer 29.

Power ON/OFF sense and control circuitry 117 monitors the voltage appearing on line 107 for supplying power to RAMs 109, 111 from a battery 119 when the voltage on line 107 falls below a predetermined level. The CMOS RAMs provide low current drain to battery 119 during powering of the RAMs by battery 119.

Microcomputer 29 utilizes safe memory 45 for storing the data and operating parameters which have been previously described with respect to memory locations identified in safe memory display 51. Such data and operating parameters are stored in safe memory 45 in order to be saved after power turn-off of the system for reuse at the time of power turn-on. The base line correction data which is computed by microcomputer 29 for use during formulation of the recording signal to smooth the recorded response, will include 800 points of data information. Such information requires time to compute by microcomputer 29 should the microcomputer have to recompute correction data each time the system is turned on. Further, the operator is able to select one of a plurality of operating parameters as described above, for use by microcomputer 29 without having to spend time for manually keying in the operating parameters. This is particularly useful with an operator who is untrained on the system.

Referring to FIG. 4, power ON/OFF sense and control circuitry 117 is illustrated in greater detail. More particularly, circuitry 117 performs two functions, one of which is to supply 3-volts from battery 119 to the CMOS RAMs when the five volt power supply on line 107 is extinguished by operator shut down of the system. The other function of circuitry 117 is to protect the RAMs' contents by disabling the WRITE conductor of the control bus 103 from actuating the WRITE port of RAMs 109, 111 so that no new data is written into the RAMs caused by spurious signals and the like appearing on the address and data bus as the power of the system is turned off. The RAMs are also protected by causing the ENABLE port of the RAMs to go HIGH, keeping the RAMs disabled during power off.

WRITE line WR carries information from control bus 103 to the WRITE port of RAMs 109, 111 via a two-input NAND gate 121. WRITE line WR forms one input to NAND gate 121 and the other input is formed by a conductor 123 which serves as a control lead for blocking the WRITE signal during power shut-down. The voltage appearing on control lead 123 is provided by a micropower voltage detector/indicator 125 (Intersil Chip No. 8211). Detector/indicator 125 monitors the five-volt power supply across a voltage divider circuit 127 comprised of three resistors R1, R2, R3 connected in series. Detector/indicator 125 changes its output signal on control lead 123 for closing gate 121 when the 5-volt source drops in voltage to a predetermined level as monitored by detector/indicator 125 via the voltage divider 127.

NAND gate 121 is an open collector NAND gate which will not draw current from its output when the chip of the NAND gate loses power. This permits a pull-up resistor 129 to be tied to its output and to the SAFE voltage generated by battery 119, so as to keep the WRITE port of the RAMs high when power is lost to the system.

Similarly, an open collector NAND gate 131 is utilized to block a RAM select signal from logic 115. A pull-up resistor 133 is connected between the output of NAND gate 131 and the SAFE voltage from battery 119 for keeping the RAMs' enable port HIGH.

The voltage supply to RAMs, 109, 111 is fed along a conductor 135 by either the voltage presented along conductor 107 from the system supply, or voltage presented along a conductor 137 from battery 119. A diode 139 is connected between conductor 137 and conductor 135 and is kept reverse biased by voltage from conductor 107 for preventing voltage from battery 119 from passing to RAMs 109, 111. Thus, battery 119 is not drained while power to the system is on.

An isolation switch circuit 141 comprising a pair of transistors 143, 145, resistors 147, 149, 151 and a pair of diodes 153, 155 are connected in a switching configuration as shown. Transistor 143 has its emitter-collector path connected between conductor 107 and conductor 135 for passing or blocking current onto lead 135. Transistor 145 controls turn-on of transistor 143 in accordance with whether 5 volts appears on conductor 107. With five volts on conductor 107, transistor 145 turns on transistor 143 providing full voltage onto line 135. When the voltage on line 107 drops below approximately 3 v, transistor 145 switches off transistor 143, effectively isolating battery 119 from the rest of the system. This prevents drain on battery 119 by the system during power shut-down of the system. As is understood, the use of a simple diode in place of circuit 141 might provide an unwanted voltage drop across the diode and, therefore, the disclosed circuit is preferred.

Referring to FIG. 3, after the system is turned on, microcomputer 29 addresses ROM 113 in order to discover whether safe memory 45 is present. ROM 113 outputs information on data bus 105 telling the microcomputer that the safe memory is, in fact, present. This permits the safe memory to be an add-on feature to the system. The microcomputer then performs a conventional check sum on the contents of RAMs 109, 111 by reading all locations of the RAMs except for a two (2) byte location. The least significant portion of the sum is compared with the two bytes of the two byte location which is not read, for determining whether proper information is stored in RAMs 109, 111. Whenever microcomputer 29 stores information in RAMs 109, 111 the two byte sum is recomputed and stored in the two byte location.

If the information is good, keyboard 39 may be utilized via safe meemory selection key 61 (FIG. 2) for instructing the microcomputer to fetch one of the various sets of operating parameters. For example, actuation of key 61 to a safe memory display of set "1" provides a SET signal which instructs the microcomputer to read the keyboard request for safe memory location "1". The microcomputer then transfers the stored information of set "1" of the RAMs 109, 111 into the microcomputer's operating RAMs.

The parameters stored in set 1 may include the rate at which the wavelength is to be scanned during the spectral analysis, the spectral range of wavelengths to be scanned in performing the analysis, the expansion of the recorder ordinate scale for scaling recording information and the particular mode of the analysis, for example, transmittance.

When key 61 is used to select set "C", the microcomputer is instructed to recompute base line correction data which has been stored in the safe memory RAMs. Base line correction data is calculated by the computer and stored as 800 correction points which are utilized in generation of the recording signal, as understood. The calculation of the 800 points is time consuming and, therefore, it is advantageous for the operator to load the correction data in safe memory for use after power shut-down. Rather than transferring all 800 points of data to its own RAM system, microcomputer 29 merely utilizes the safe memory RAMs.

ROM 113 of safe memory 45 is utilized to store the programs for use with the safe memory. Primarily, the programs include bookkeeping functions, as for example, where to store data coming from the keyboard. Other functions include the check sum, as described above, the recognition feature for telling microcomputer 29 that safe memory exists, as described above, and the basic loading and unloading of parameters from safe memory.

The main operating program of the microcomputer must search for the safe memory by reading an anticipated memory location which is the address location of ROM 113. If the main program recognizes the combination of codes in ROM 113, indicating safe memory is present, the main program allocates control time to the safe memory program stored in ROM 113, for the purpose of administering the safe memory parameter storage, parameter retrieval and error checking.

The safe memory program can be accomplished in various forms. The program merely involves receiving a safe memory set signal via safe memory key 61 for providing an instruction to microcomputer 29 to transfer the particular memory set into te microcomputer's RAM locations. A LOAD instruction generated by load key 63 merely instructs microcomputer 29 to receive the parameters being keyed in at the keyboard for transfer to an appropriate location in the RAM memory of the safe memory. The main program of the microcomputer utilizes the stored parameters for controlling the overall analysis of the system (see the above referenced U.S. patent application Ser. Nos. 128,289 and 128,029 for details).

It should be understood, of course, that the foregoing disclosure relates to a preferred embodiment of the invention and that other modifications or alterations may be made therein without departing from the spirit or scope of the invention as set forth in the appended claims.

What is claimed is:

1. A spectrophotometer comprising monochromator means for providing monochromatic light at a sequence of wavelengths over a predetermined spectral range; a sample cell; a light measuring device; means for directing said monochromatic light through said sample cell and onto said light measuring device;
recorder means for recording an indication of the spectral response of said measuring device;
keyboard means operator actuable for generating operating parameters, said keyboard means selectively operable for generating a safe memory SET signal;
safe memory means for storing a plurality of sets of operating parameters;
microcomputer means for communicating with said keyboard means and said memory means; and for controlling the operation of a spectrophotometer analysis including control of said monochromator means in accordance with the parameters of one of said sets, and responsive to a said safe memory SET signal for addressing one of said sets of operating instructions in said safe memory means for controlling operation of the spectrophotometer in accordance with said set addressed, and for storing operating parameters generated by said keyboard means in said safe memory means;
power supply means for receiving A.C. power and transforming said A.C. power to D.C. power for powering said microcomputer means;
an ON/OFF switch manually actuable for supplying said D.C. power from said power supply means to said microcomputer means and for discontinuing supplying of said D.C. power to said microcomputer means; and
D.C. battery means connected to said safe memory means for powering said safe memory means when said D.C. power is discontinued supplying said microcomputer means.

2. A spectrophotometer according to claim 1, and further including power ON/OFF sensor means for sensing loss of D.C. power to said microcomputer means for responsively connecting power from said D.C. battery means to said safe memory means.

3. A spectrophotometer according to claim 1 wherein said safe memory means includes random access memory means; and wherein said power ON/OFF sensor means includes inhibiting means actuable for inhibiting transmission of a WRITE control signal to the WRITE port of said random access memory means; and voltage monitoring means for monitoring said D.C. power and responsively actuating said inhibiting means for inhibiting transmission of said WRITE control signal.

4. A spectrophotometer according to claim 1, wherein said microcomputer means includes random access memory means, said microcomputer means transferring said operating parameters from said safe memory means to said random access memory means for controlling the operation of a spectrophotometer analysis.

5. A spectrophotometer according to claim 1, wherein said microcomputer means includes means for addressing said safe memory means, and means including a ROM for said safe memory means to output information telling the microcomputer means that it is in fact operatively connected thereto.

6. A spectrophotometer according to claim 1, wherein said safe memory means includes a memory location for storage of a check code; and wherein said microcomputer performs a mathematical operation on said operating parameters stored in said safe memory means for computing a result for comparison with said check codes stored in said memory location, for determining whether correct data has been stored in said safe memory means.

7. A spectrophotometer according to claim 6, wherein said microcomputer means computes the binary sum of numerical data stored in said memory means and compares select bits of said sum with said check code.

8. A spectrophotometer according to claim 6, wherein said microcomputer means recomputes said check code whenever information is stored in said safe memory means.

9. A spectrophotometer according to claim 1, wherein said keyboard means is operator actuable for selectively generating one of a plurality of safe memory SET signals, each of said SET signals for instructing said microcomputer means to utilize a select one of said sets of operating parameters for controlling the spectrophotometer.

* * * * *